(12) United States Patent
Mullens et al.

(10) Patent No.: US 10,075,439 B1
(45) Date of Patent: Sep. 11, 2018

(54) PROGRAMMABLE FORMAT FOR SECURELY CONFIGURING REMOTE DEVICES

(71) Applicant: Cisco Technology, Inc., San Jose, CA (US)

(72) Inventors: Ryan J. Mullens, Holliston, MA (US); Sachin Vasant, Brookline, MA (US); Raphael Luckom, Salem, MA (US); Denis Knjazihhin, Lexington, MA (US); Yedidya Dotan, Newton, MA (US)

(73) Assignee: Cisco Technology, Inc., San Jose, CA (US)

( * ) Notice: Subject to any disclaimer, the term of this patent is extended or adjusted under 35 U.S.C. 154(b) by 176 days.

(21) Appl. No.: 15/158,998

(22) Filed: May 19, 2016

Related U.S. Application Data (60) Provisional application No. 62/251,733, filed on Nov. 6, 2015.

(51) Int. Cl.
| | | |
|---|---|---|
| *H04L 9/32* | (2006.01) | |
| *H04L 29/06* | (2006.01) | |
| *H04L 12/24* | (2006.01) | |
| *H04L 12/931* | (2013.01) | |
| *H04L 29/08* | (2006.01) | |
| *G06F 8/65* | (2018.01) | |

(52) U.S. Cl.
CPC ............ *H04L 63/0884* (2013.01); *G06F 8/65* (2013.01); *H04L 9/3263* (2013.01); *H04L 41/0806* (2013.01); *H04L 49/70* (2013.01); *H04L 63/0281* (2013.01); *H04L 63/0442* (2013.01); *H04L 67/327* (2013.01)

(58) Field of Classification Search
CPC ............ H04L 63/0884; H04L 63/0281; H04L 9/3263; H04L 63/0442; H04L 67/327; H04L 49/70; H04L 41/0806; G06F 8/65
USPC ......................................................... 713/168
See application file for complete search history.

(56) References Cited

U.S. PATENT DOCUMENTS

| | | | |
|---|---|---|---|
| 8,789,179 B2 | 7/2014 | Sabin | |
| 9,053,348 B2 | 6/2015 | Venkatesan et al. | |
| 9,171,008 B2 | 10/2015 | Prahlad et al. | |
| 9,172,766 B2 | 10/2015 | Narasimhan et al. | |
| 2013/0003974 A1* | 1/2013 | Adams | H04L 51/14 380/270 |

(Continued)

OTHER PUBLICATIONS

P. Yellamma et al., "Intelligent Data Security in Cloud Computing", International Journal or Current Engineering and Technology, vol. 4, No. 1, Feb. 2014, E-ISSN 2277 - 4106, P-ISSN 2347 - 5161, Inpressco, http://inpressco.com/category/ijcet, General Article, 5 pages.

*Primary Examiner* — Mohammad W Reza
(74) *Attorney, Agent, or Firm* — Edell, Shapiro & Finnan, LLC (57) ABSTRACT

A method is provided in which a development environment sends commands to an on-premises device that are signed by both (a) development environment and by (b) an execution environment (trusted source), and account for versioning. In so doing, the on-premises device that receives the command is able to authenticate both the sending entity, i.e., a production server, and the source of the command files to determine that the command is a valid configuration/upgrade package that may be safely installed and executed.

20 Claims, 8 Drawing Sheets

(56) References Cited

U.S. PATENT DOCUMENTS

2016/0269367 A1* 9/2016 Cocotis .............. H04L 67/1097

* cited by examiner

PROGRAMMABLE FORMAT FOR SECURELY CONFIGURING REMOTE DEVICES

PRIORITY CLAIM

This application claims priority to U.S. Provisional Application No. 62/251,733, filed Nov. 6, 2015, the entirety of which is incorporated herein by reference.

TECHNICAL FIELD

The present disclosure relates to upgrading network security devices and software.

BACKGROUND

In systems that include a cloud-based component and a remote (on premise) component, it is often necessary to dynamically update commands that run on the remote component based on instructions received from the cloud-based component. In certain deployments, such as government and financial institutions, there is a requirement that network devices provide secure and continuous services. This, however, can be difficult to enforce, particularly when the software running on remote devices needs to be dynamically upgraded or patched due to security concerns. For example, dynamically upgrading commands to run on remote components, while known in the prior art, may cause security vulnerabilities that can be exploited, e.g., insertion of malicious code into the updated commands. In such deployments, therefore, it may be necessary to securely reconfigure remote network devices, on demand, without causing a loss of network services or the execution of malicious code, e.g., viruses, worms or Trojan horses.

DESCRIPTION OF EXAMPLE EMBODIMENTS

In accordance with one embodiment, a method and system are disclosed in which a development environment sends commands to a remote proxy entity. The commands are signed by both (a) the development environment and (b) a production environment, i.e., a trusted source. In so doing, the remote proxy entity that receives the commands is able to authenticate both the sending entity, e.g., a production server, and the source of the command files, e.g., a build server, to determine that the commands are a valid configuration/upgrade package that may be safely installed and executed.

Example Embodiments

Figure 1:
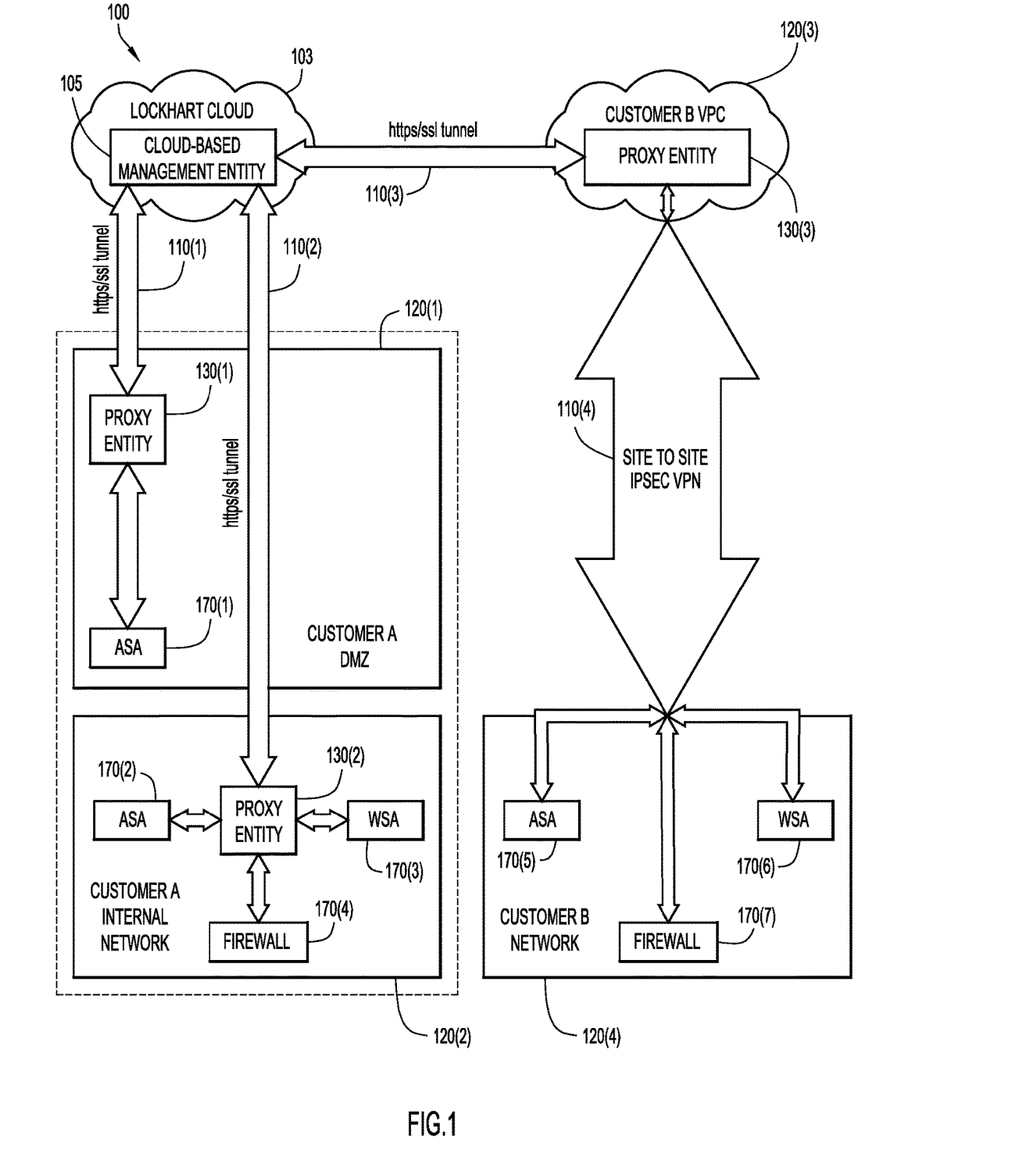
FIG. 1 is a high-level diagram illustrating a cloud-based network security management system in which software on a remote proxy entity is updated, according to an example embodiment.

With reference first to FIG. 1, there is depicted a block diagram of a cloud-based network security management system 100 that includes a cloud-based management entity 105 and a plurality of customer sites/networks 120(1)-120(N), each of which may include at least one proxy entity. As shown in FIG. 1, customer site/network 120(1) may include a demilitarized zone "DMZ" associated with a first customer and customer site/network 120(2) may include an internal network associated with the first customer. Similarly, customer site/network 120(3) may comprise a virtual private cloud ("VPC") associated with a second customer, which is in communication with an internal network 120(4) associated with the second customer. Customer site 120(1) includes remote proxy entity 130(1), customer site 120(2) includes remote proxy entity 130(2), and customer site 120(3) includes remote proxy entity 130(3). The cloud-based management entity 105 communicates with customer sites/networks 120(1)-120(N) by way of one or more secure tunnels. That is, there is a security tunnel 110(1) between cloud-based management entity 105 and proxy entity 130(1), a secure tunnel 110(2) to proxy entity 130(2), and a secure tunnel 110(3) to proxy entity 130(3). Each proxy entity may be in communication with one or more network security devices. For example, proxy entity 130(1) is in communication with network security device 170(1), proxy entity 130(2) is in communication with network security devices 170(2), 170(3) and 170(4), and proxy entity 130(3) is in communication, via secure tunnel 110(4), with network security devices 170(5), 170(6) and 170(7). In one example, any of the network security devices shown in FIG. 1 may perform one or more of the following functions: firewall, intrusion prevention, intrusion detection, establishing and managing virtual private networks, antivirus scanning, and/or content/spam filtering.

Generally cloud-based management entity 105 compiles input source code to generate one or more executable commands, aggregates the one or more executable commands in a packaged command file, and signs the packaged command file using a private encryption key uniquely associated with itself. Cloud-based management entity 105 may encrypt the signed command file with a public key associated with proxy entity 130(i), which may be located at customer site/network 120(1)-120(N), and transmits the command file to proxy entity 130(i). According to an embodiment, management entity 105 may transmit a signed command file over a secure tunnel 110(1)-110(N) using a shared encryption key, e.g., a secure socket layer ("SSL") or secure hyper text transport protocol ("https") tunnel, which proxy entity 130(1)-130(N) may decrypt using its private encryption key and authenticate using the public key associated with management entity 105. According to an embodiment, if proxy entity 130(i) successfully authenticates the command file as originating from management server 105, it may execute the one or more packaged commands included in the command file to control and/or manage network security devices 170(1)-170(N). As shown, each proxy entity 130(i) is further authenticated because management entity 105 can only send commands encrypted by private/public keys uniquely associated with a given proxy entity 130(i), resulting in an additional layer of authentication for the management entity 105, that created the commands.

It is to be understood that there may be multiple customer sites/networks 120(1)-120(N) as indicated in FIG. 1, wherein each customer site/network may have one or more proxy entities 130(1)-130(N).

The cloud-based network security management system 100 allows for the cloud-based management entity 105 to manage a variety of network security devices of different types and different vendors in each customer site. The proxy entity at each customer site serves as an intermediary between the cloud-based management entity 105 and the network security devices at that customer site.

Figure 2:
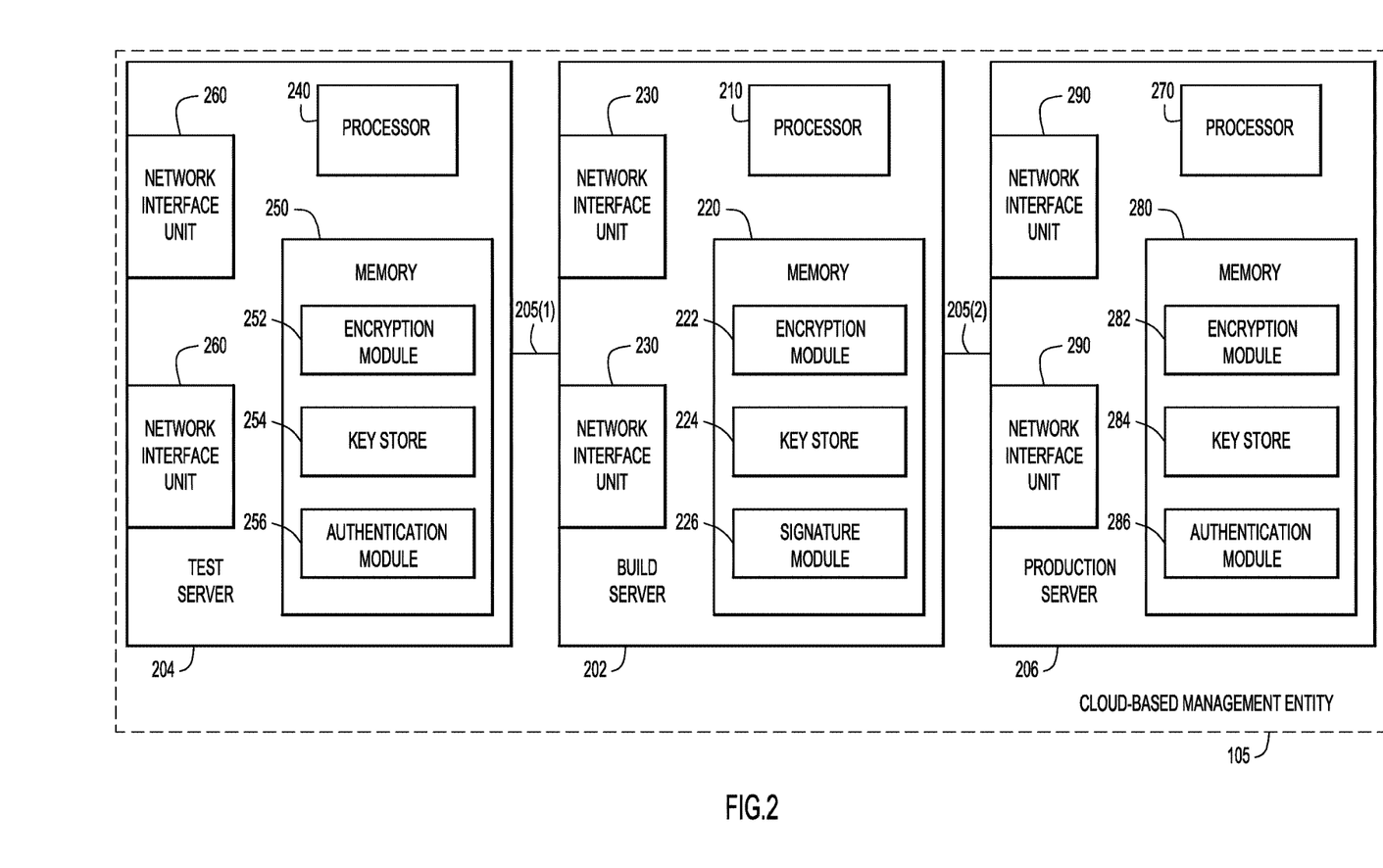
FIG. 2 is a block diagram of a cloud-based management entity, according to an example embodiment.

Reference is now made to FIG. 2. FIG. 2 describes cloud-based management entity 105 of FIG. 1 in more detail. Cloud-based management entity 105 includes build server 202, test server 204 and production server 206. While test server 204 and production server 206 are shown as being included within cloud-based management entity 105, this is an illustrative example and it should be understood that the functionality of build server 202, test server 204 and/or production server 206 may be performed entirely at management entity 105, entirely at customer site/network 120(i) or some operations may be performed at management entity 105 and/or at customer site/network 120(i).

Build server 202 further includes one or more processors 210, a memory 220 and one or more network interface units 230. To this end, memory 210 stores instructions for build server 202, encryption module 222, and signature module 226, and stores data for build key store 224. Similarly, test server 204 further includes one or more processors 240, a memory 250 and one or more network interface units 260, wherein memory 250 stores instructions for test server 204, encryption module 252, and authentication module 256, and stores data for test key store 254. Finally, production server 206 further includes one or more processors 270, a memory 280 and one or more network interface units 290, wherein memory 280 stores instructions for production server 206, encryption module 282, and authentication module 286, and stores data for production key store 284. Build server 202 is in communication with test server 204 by at least secure tunnel 205(1) and is in communication with production server 206 by at least secure tunnel 205(2).

For security reasons, build server 202, test server 204 and production server 206 are separate entities, i.e., they do not share any components, modules or memory. Isolating servers 202, 204 and 206 allows management entity 105 to confirm securely that build server 202 is correctly authenticated and that the configured command files may be safely executed on one or more proxy entities 130(i). The one or more processors 210, 240 and 270 may be a microprocessor or a microcontroller. The one or more network interface units 230, 260 and 290 enable network communication, such as wired or wireless network communication, e.g., to communicate with each other and/or proxy entity 130(i). The memory 220, 250 and 280 may include read only memory (ROM), random access memory (RAM), magnetic disk storage media devices, optical storage media devices, flash memory devices, electrical, optical, or other physical/tangible memory storage devices. Processors 210, 240 and 270 execute instructions for build server 202, test server 204 and production server 206, wherein the instructions are stored in memory 220, 250 and 280, respectively. For example, processor 270 may execute instructions causing encryption module 282 to encrypt command files to be transmitted to proxy entity 130(i).

Build server 202 includes instructions for compiling source code associated with one or more commands, packaging the one or more commands into a command file, and signing the packaged command file. Build key store 224 stores at least private encryption keys and private signature keys uniquely associated with build server 202. It is understood that any cryptographic key capable of uniquely identifying build server 202 may be used as a signature key. Test server 204 includes instructions for authenticating a signed command file and for executing the one or more commands included in the command file. Test key store 254 stores at least private encryption keys uniquely associated with test server 204 as well as public encryption and signature keys associated with build server 202 and production server 206. Production server 206 includes instructions for deploying the current version of the command file to proxy entity 130(i). Production key store 284 stores at least public encryption keys associated with proxy entity 130(i), public encryption keys associated with test server 204, and public encryption and signature keys associated with build server 202. Encryption modules 222, 252 and 282 include instructions for encrypting and decrypting command files. Encryption modules 222, 252 and 282 further include instructions for generating encryption keys associated with build server 202, test server 204 and production server 206, respectively, e.g., asymmetric public/private key pairs. Additionally, signature module 226 includes instructions for signing command files with a private signature key, while authentication modules 256 and 286 include instructions for authenticating a signed command file.

Figure 3:
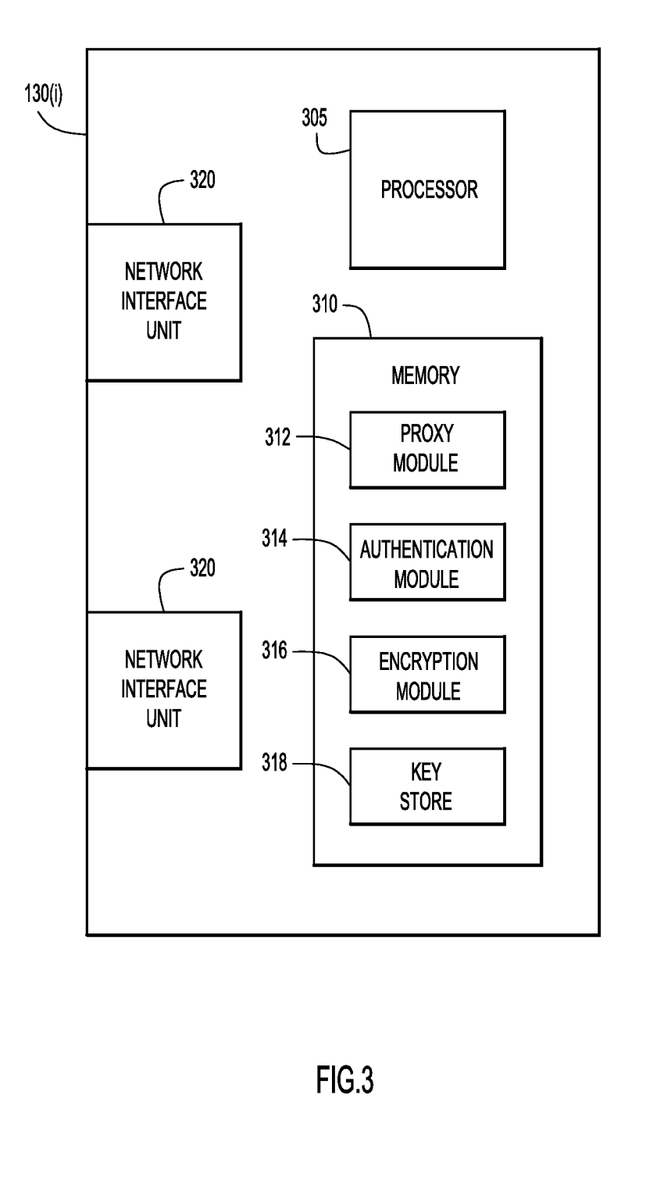
FIG. 3 is a block diagram of the remote proxy entity, according to an example embodiment.

Reference is now made to FIG. 3. FIG. 3 shows a block diagram of a proxy entity generically referred to as proxy entity 130(i) and representative of any of the proxy entities shown in FIG. 1. Proxy entity 130(i) includes one or more processors 305, a memory 310 and one or more network interface units 320. To this end, memory 310 stores instructions for proxy module 312, authentication module 314, and encryption module 316, and stores data for key store 318. The one or more processors 305 may be a microprocessor or a microcontroller. The one or more network interface units 320 enable network communication, such as wired or wireless network communication, e.g., to communicate with management entity 105 and with the network security devices at a customer site/network. Memory 310 may include read only memory (ROM), random access memory (RAM), magnetic disk storage media devices, optical storage media devices, flash memory devices, electrical, optical, or other physical/tangible memory storage devices. Processor 305 executes instructions for proxy module 312, authentication module 314 and encryption module 316 stored in the memory 310. For example, processor 305 may execute instructions causing encryption module 316 to decrypt command files received from management entity 105.

Thus, in general, memory 310 may include one or more tangible (non-transitory) computer readable storage media (e.g., a memory device) encoded with software comprising computer executable instructions and when the software is executed (by processor 305) it is operable to perform the operations of the proxy entity 130(i) described herein.

Proxy module 312 includes instructions for executing one or more commands included in a command file received from management entity 105, and these are commands that are used to coordinate the management of the network security devices at a customer site/network under control of the cloud-based management entity 105. In one form, the proxy module 312 may take the form of a virtual machine that runs on a hypervisor on the proxy entity 130(i). Authentication module 314 includes instructions for authenticating signed command files. Encryption module 316 includes instructions for encrypting and decrypting messages transmitted and received by network interface unit 320, as well as for generating encryption keys associated with proxy entity 130(i), e.g., symmetric channel keys and/or asymmetric public/private key pairs. Key store 318 stores encryption keys generated by encryption module 316, as well as public encryption keys associated with management entity 105, including, but not limited to, public signature keys associated with build server 202 and public encryption keys associated with production server 206.

Figure 4:
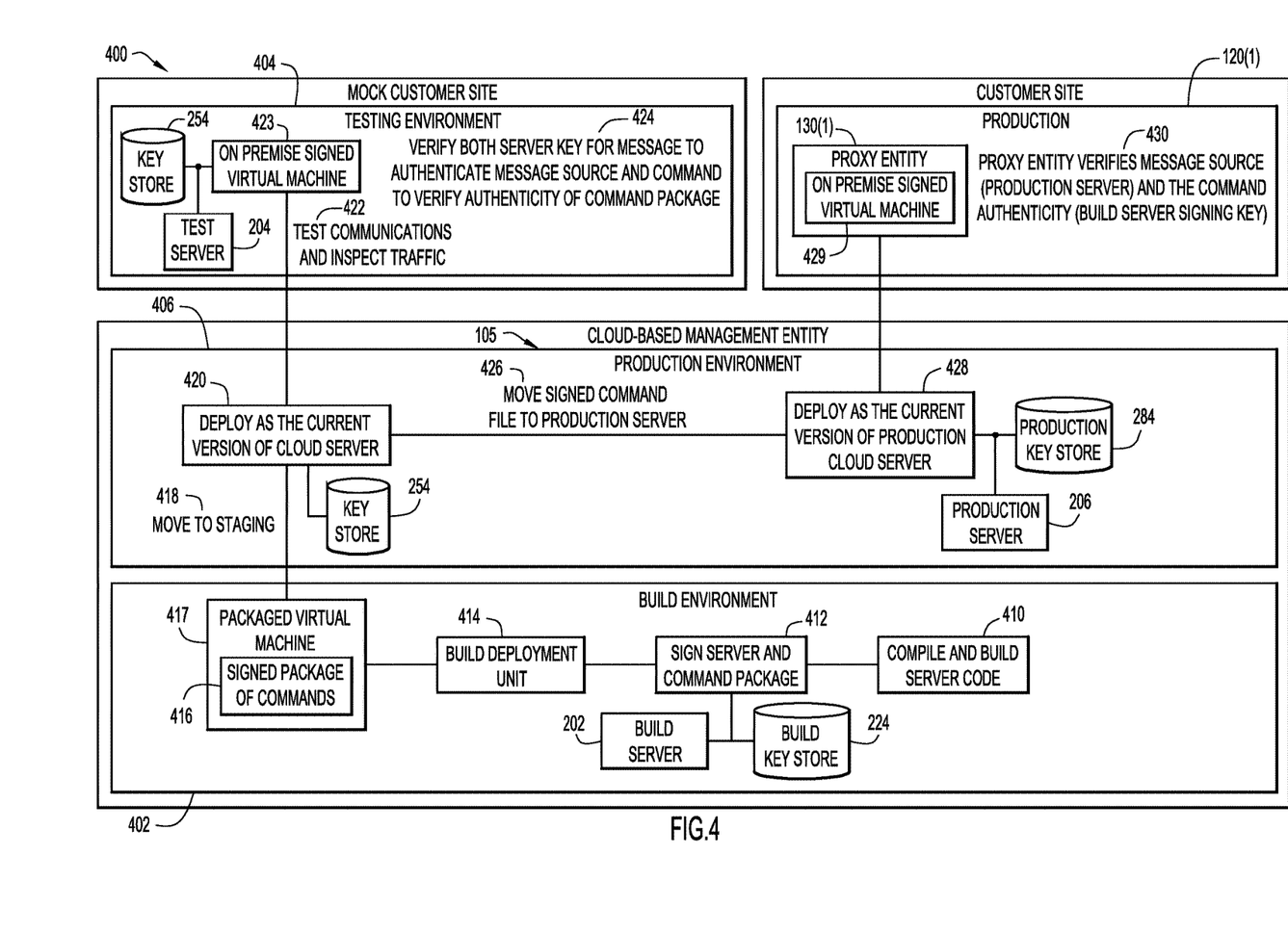
FIG. 4 is a diagram of an example method of operations performed to deliver a configurable command file from a build environment to the remote proxy entity, according to an example embodiment.

Reference is now made to FIG. 4 for a diagram of operations 400 associated with delivering a command file to a proxy entity, according to an example embodiment. FIG. 4 shows cloud-based management entity 105 and a production (actual) customer site arbitrarily denoted by reference numeral 120(1). According to an embodiment, management entity 105 includes a build environment 402 in which the build server 202 runs, a testing environment 404 in which the test server 204 runs, and a production environment 406 in which the production server 206 runs. Build environment 402 further includes the build key store 224, test environment 404 further includes the test key store 254, and production environment 406 further includes the test key store 254 and production key store 284. The system shown in FIG. 4 addresses the need to upgrade the version of a command file that is resident on a remote proxy entity 130(i) at the customer site/network. Although FIG. 4 shows build server 202, test server 204 and production server 206 in management entity 105, the functionality of build server 202, test server 204 and/or production server 206 may be performed entirely at management entity 105, entirely at customer site/network 120(i) or some operations may be performed at management entity 105 and/or at customer site/network 120(i).

Operations 400 involve the progression of a signed package and associated communications to deploy the signed package to a customer site. At step 410, the build server 202 builds and compiles a server code to be deployed on a customer site. At step 412, build server 202 signs the commands with a private signature key that it retrieves from key store 224, and, at step 414, builds a deployment unit, e.g., an "immutable package" or an Amazon Machine Image ("AMI"). The signed package of commands is shown at reference numeral 416 as part of a package virtual machine 417. At step 418, the signed package of commands is moved for staging in production environment 406 when the build is complete. According to an embodiment, build server 202 may periodically deploy the signed server packages to production environment 406.

At step 420, the "staging" phase is initiated as production server 206 retrieves the encryption keys associated with test environment 404 from test key store 254 and deploys the packaged commands to test environment 404 to operate as an on premise signed virtual machine 423. At step 422, test server 204 tests the packaged commands to ensure that the command protocol has not been maliciously altered. Communication between production server 206 and testing environment 404 may be allowed to occur for a predetermined period in step 422, during which time the traffic is inspected to detect for any anomalies. During the deployment to test environment 404, two encryption keys are verified. The first is the encryption key used to authenticate production server 206 to test server 204, and the second encryption key, the public signature key associated with build server 202, is used to authenticate that the command was built by the correct build environment 402, and is not malicious code. Accordingly, at step 424, test server 204 verifies both the encryption key associated with production server 206, authenticating the message source, and the command signature key associated with build server 202, verifying the authenticity of the received command package.

At step 426, the "production" phase is initiated as production server 206 selects a release candidate image and the verified and tested server image is deployed to production environment 406. This may occur dynamically or on a periodic basis, e.g., daily, weekly, etc. Production encryption keys are associated with specific customers and are created by production server 206. The per customer encryption keys are secured in production key store 284. At step 428, the production server 206 deploys the selected image as an on premise signed virtual machine 429 to proxy entity 130(1) at customer site 120(1). Production server 206 may use any now known or hereafter developed technique to transmit the selected image to proxy entity 130(1) including, but not limited to, https, SSL and/or IPsec protocols. At step 430, proxy entity 130(1) receives the message from production server 206, decrypts the message and verifies the signature associated with the message, i.e., verifies that the message was signed with a signature key associated with build server 202. In so doing, proxy entity 130(1) verifies both that the message was intended for it as well as the authenticity of production server 206. Proxy entity 130(1) also verifies that the command was signed by build server 202. Thus, in step 430, proxy entity 130(1) verifies the message source (i.e., production server 206) and the authenticity of the command based on the signature key associated with build server 202.

Figure 5:
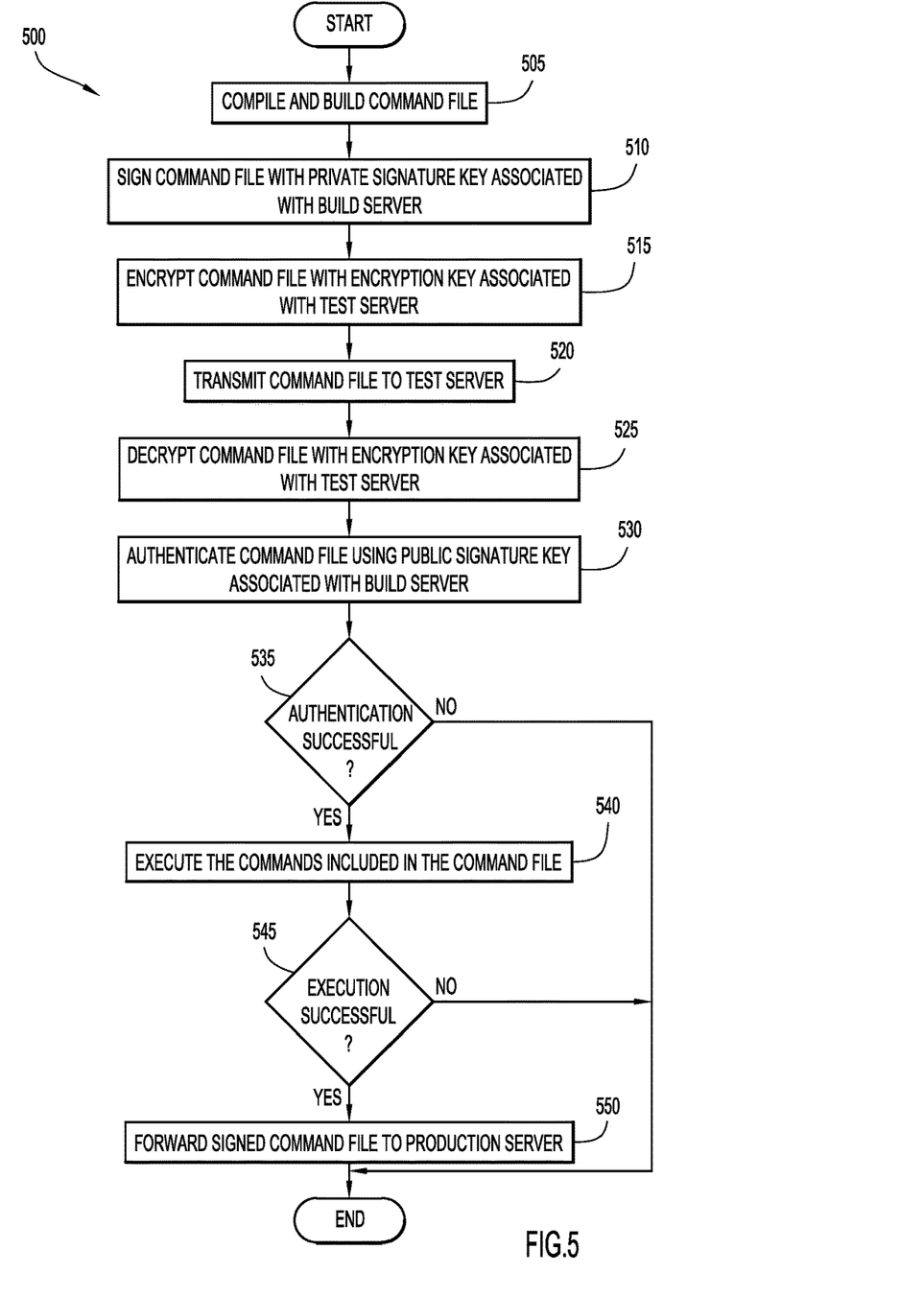
FIG. 5 is a flowchart depicting operations performed to build and test a configurable command file, according to an example embodiment.

With reference to FIG. 5, a flowchart is shown of operations of a method 500 to securely test a configurable command file. Reference may also be made to FIGS. 1-4 in connection with the description of FIG. 5. It is to be understood that the operations shown in FIG. 5 may be performed entirely at the cloud-based management entity 105, entirely at a customer site/network 120(i) or some operations may be performed at cloud-based management entity 105 and/or at a customer site/network 120(i).

At 505, build server 202 compiles source code associated with one or more commands to produce executable commands, and packages the one or more executable commands into a command file. At 510, build server 202 signs the packaged command file including the one or more executable commands using a signature key associated with build server 202. In an embodiment, the signature key associated with build server 202 is a private signature key in accordance with a public key infrastructure ("PKI") protocol, including, but not limited to, public key cryptography standards ("PKCS"), cryptographic message syntax ("CMS"), X.509, or certificate management protocol ("CMP"). In a further embodiment, build server 202 signs each of the one or more executable commands included in the command file using its private signature key.

At 515, production server 206 encrypts the signed command file including the one or more executable commands using an encryption key that is associated with test server 204.

At 520, production server 206 transmits the command file to test server 204. According to an embodiment, production server 206 encrypts the command file with an encryption key shared with test server 204, i.e., a symmetric key.

At 525, test server 204 receives the transmitted command file and decrypts the command file. In an embodiment, test server 204 uses at least a private encryption key associated with test server 204 to decrypt the received command file.

At 530, test server 204 authenticates the signed command file as originating from build server 202 using a signature key associated with build server 202. In an embodiment, the signature key is a public signature key associated with build server 202.

At 535, test server 204 determines whether the command file was successfully authenticated. If test server 204 successfully authenticated the signed command file, operation proceeds to 540, otherwise method 500 ends.

At 540, assuming operation 530 successfully authenticated the command file, test server 204 executes the one or more executable commands included in the command file.

At 545, test server 204 determines whether the one or more commands were successfully executed. If test server 204 successfully executed the one or more commands, operation proceeds to 550, otherwise method 500 ends. According to an embodiment, the one or more commands are executed by a virtual machine running on test server 204.

At 550, assuming operation 545 successfully executed the one or more executable commands, the signed command file is forwarded to production server 206 for deployment to proxy entity 130(*i*), and method 500 ends.

Figure 6:
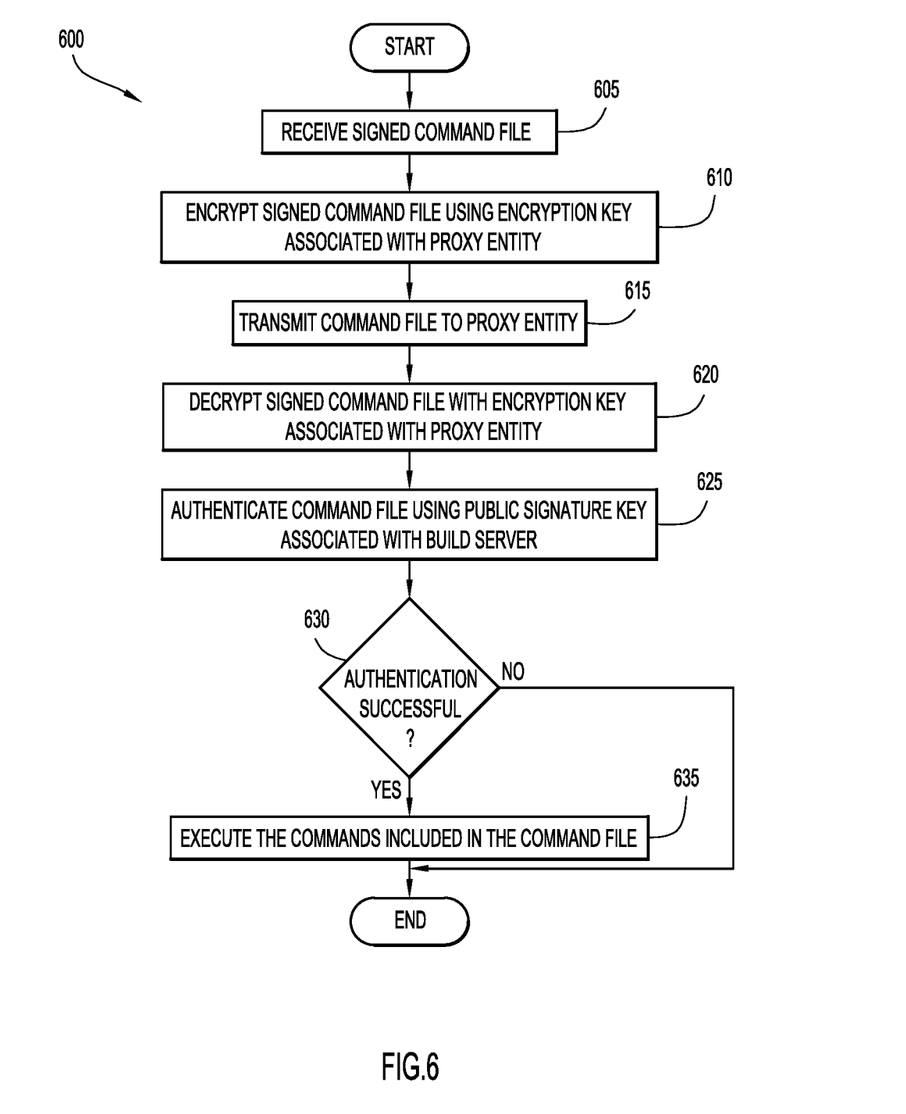
FIG. 6 is a flowchart depicting operations performed to deploy a command file from a production environment to the remote proxy entity, according to an example embodiment.

With reference to FIG. 6, a high-level flowchart is shown for example operations of a method 600 performed by system 100 to securely deploy a configurable command file to a remote proxy entity 130(*i*). Reference may also be made to FIGS. 1-4 in connection with the description of FIG. 6. It is to be understood that the operations shown in FIG. 6 may be performed entirely at the cloud-based management entity 105, entirely at a customer site/network 120(*i*) or some operations may be performed at cloud-based management entity 105 and/or at customer site/network 120(*i*).

At 605, production server 206 receives the signed command file including the one or more executable commands and, at step 610, encrypts the signed command file using an encryption key that is associated with proxy entity 130(*i*). In an embodiment, the encryption key is a public encryption key associated with proxy entity 130(*i*) in accordance with a PKI protocol, including, but not limited to, PKCS, CMS, X.509, or CMP.

At 615, production server 206 transmits the command file to proxy entity 130(*i*). According to an embodiment, production server 206 may encrypt the command file with a shared encryption key, i.e., a symmetric key, before transmitting the file to proxy entity 130(*i*). Production server 206 may use any now known or hereafter developed technique to transmit the selected image to proxy entity 130(*i*), including, but not limited to, https, SSL and/or IPsec protocols.

At 620, proxy entity 130(*i*) receives the transmitted command file and decrypts the command file using at least a private encryption key associated with proxy entity 130(*i*). According to an embodiment, proxy entity 130(*i*) may decrypt the command file using the shared encryption key, i.e., the symmetric key.

At 625, proxy entity 130(*i*) authenticates the signed command file as originating from build server 202 using at least a signature key associated with build server 202. In an embodiment, the signature key associated with build server 202 is a public signature key.

At step 630, proxy entity 130(*i*) determines whether the signed command file was successfully authenticated. If proxy entity 130(*i*) successfully authenticated the signed command file, operation proceeds to 630, otherwise method 600 ends.

At 635, assuming operation 625 successfully authenticated the command file as originating from build server 202, proxy entity 130(*i*) executes the one or more executable commands included in the command file, and method 600 ends. According to an embodiment, the one or more commands are executed by a virtual machine running on proxy entity 130(*i*).

Figure 7:
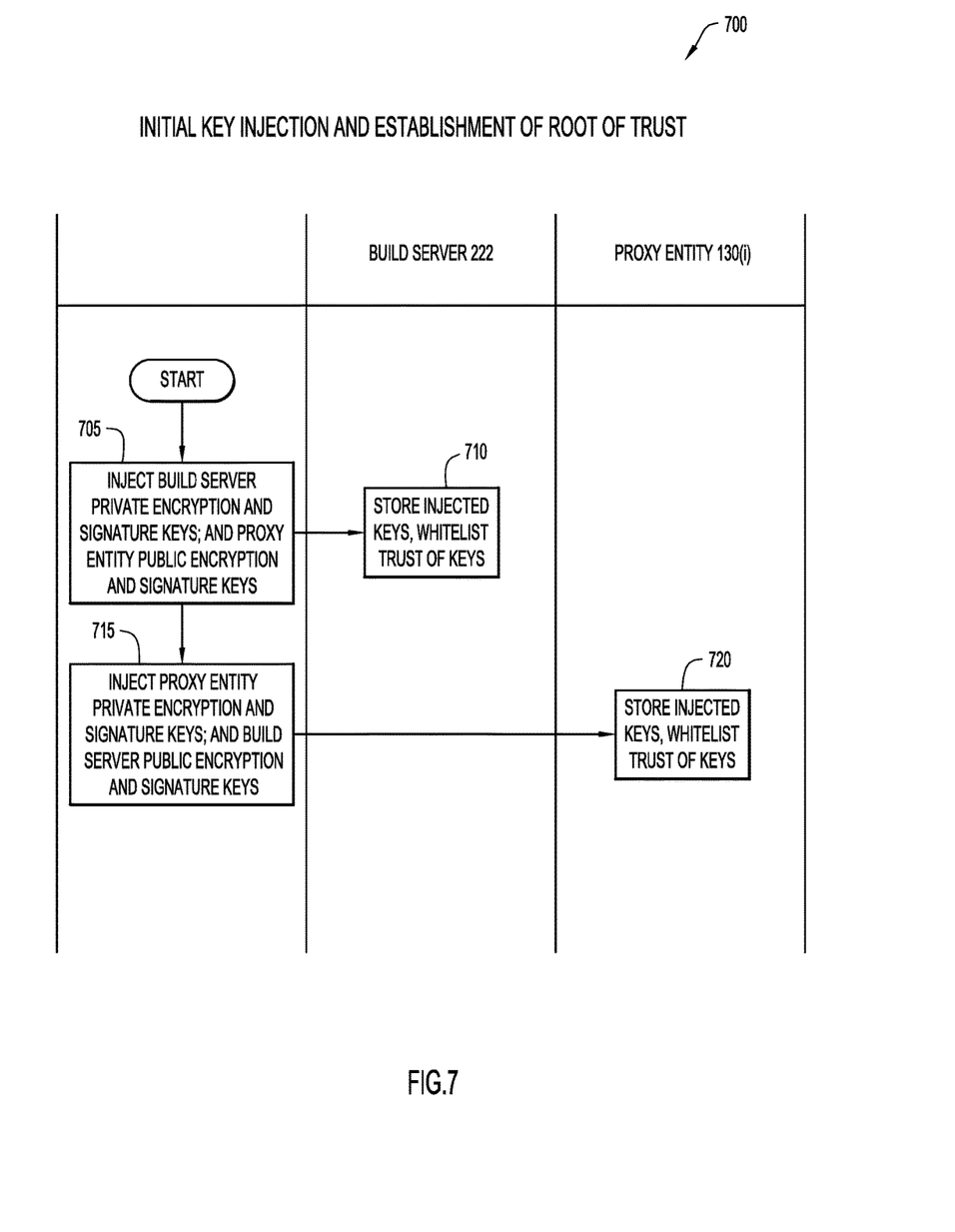
FIG. 7 illustrates a message flow to perform an initial key exchange in the cloud-based network security management system, according to an example embodiment.

With reference to FIG. 7, there is an illustration of communications between entities that are part of the process 400 shown in FIG. 4. Reference is also made to FIGS. 1-4 for purposes of this description. Initially, encryption module 222 generates and/or retrieves encryption keys associated with build server 202 and proxy entity 130(*i*). In an embodiment, the encryption keys associated with build server 202 and proxy entity 130(*i*) are public and private encryption keys and public and private signing keys, in accordance with a PKI protocol, including, but not limited to, PKCS, CMS, X.509, or CMP.

At step 705, encryption module 222 injects the private encryption key and the private signature key associated with build server 202, as well as the public encryption key and the public signing key associated with proxy entity 130(*i*), into build server 202.

At step 710, build server 202 stores the injected encryption and signature keys as part of a whitelist trust of keys.

At step 715, encryption module 316 injects the private encryption key and the private signature key associated with proxy entity 130(*i*), as well as the public encryption key and the public signature key associated with build server 202, into proxy entity 130(*i*).

At step 720, the proxy entity 130(*i*) stores the injected keys in key store 318.

Figure 8:
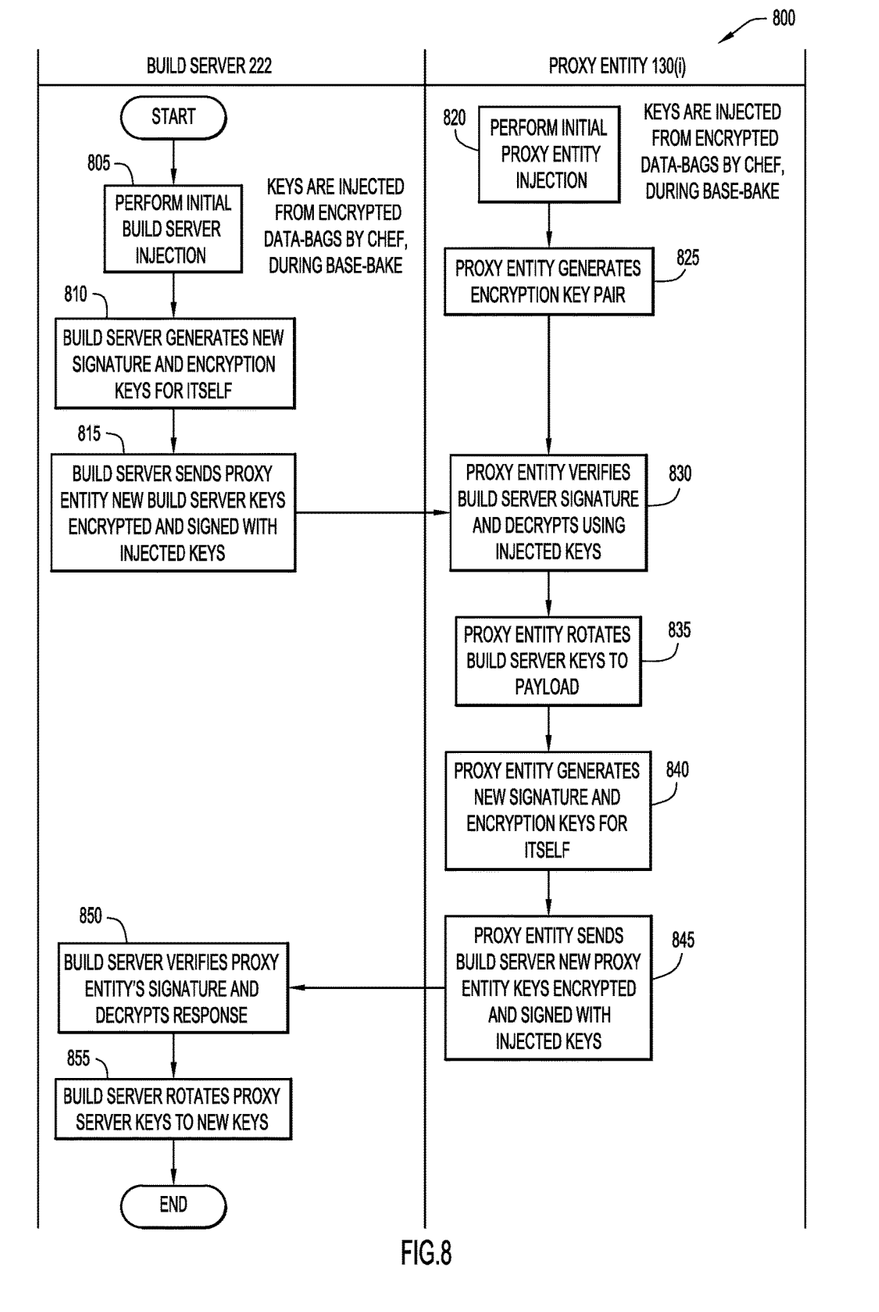
FIG. 8 illustrates message flow to perform an initial handshake between the development and production environments, according to an example embodiment.

With reference to FIG. 8, there is an illustration of an initial handshake method 800 to establish communications between entities that are part of the process 400 shown in FIG. 4. Reference is also made to FIGS. 1-4 for purposes of this description.

Initially, at step 805, encryption module 222 injects build server 202 with an initial set of encryption keys. According to an embodiment, the injected encryption keys may be a master seed or pin used to generate further encryption keys.

At step 810, build server 202 generates encryption keys associated with build server 202. In an embodiment, the encryption keys associated with build server 202 are public and private encryption keys and public and private signature keys. In a further embodiment, build server 202 generates the encryption keys and signature keys using the encryption keys injected at step 805.

At step 815, build server 202 generates a message including the encryption and signature keys generated at step 810. Build server 202 encrypts and signs the generated message using the encryption and signature keys associated with build server 202, and transmits the encrypted and signed message to proxy entity 130(*i*), and operation proceeds to step 830.

At step 820, encryption module 316 injects proxy entity 130(*i*) with an initial set of encryption keys. According to an embodiment, the injected encryption keys may be a master seed or pin further used to generate encryption keys. According to a further embodiment, the initial set of encryption keys may be the encryption keys injected in step 805.

At step 825, proxy entity 130(*i*) generates an encryption key pair to securely transmit trusted credentials. In an embodiment, proxy entity 130(i) generates the encryption key pair using the encryption keys injected in step 820.

At step 830, proxy entity 130(i) verifies the signature received in step 815 as originating from build server 202 and decrypts the received set of encryption keys using the initial encryption keys injected at step 820.

At step 835, proxy entity 130(i) stores the received encryption keys in key store 318, and, at step 840, generates a new set of encryption and signing key pairs associated with itself.

At step 845, proxy entity 130(i) generates a response to the message received at step 830, wherein the generated response may include signature and encryption keys, as well as credential encryption keys associated with proxy entity 130(i). Said another way, the proxy entity keys are encrypted and signed with the injected keys, and are sent to the build server 202.

At step 850, build server 202 verifies the signature of the response generated at step 845 as originating from proxy entity 130(i), and decrypts the response to recover the message signing and encryption keys, as well as the credential encryption keys associated with proxy entity 130(i).

At step 855, build server 202 stores the encryption keys associated with proxy entity 130(i), and process 800 ends.

The system and method disclosed herein securely configures remote devices using a cloud-based management entity that transmits signed and encrypted commands for remote execution on a plurality of remote proxy entities, which may be located at one or more customer sites/networks. The cloud-based management entity comprises a build environment, a testing environment and a production environment. At the cloud-based management entity, the build environment initially compiles source code associated with one or more executable commands, and packages the one or more executable commands in a command file, which it signs with a signature key uniquely identifying the build environment. The build environment forwards the signed command file to the production environment, which deploys the command file to the testing environment to determine whether the one or more commands may be successfully authenticated, and, if so, whether the one or more commands may be successfully executed. If the commands are successfully authenticated and executed, the production environment encrypts the command file with a public encryption key associated with a specific proxy entity and transmits the encrypted command file to the proxy entity. After receiving the command file, the proxy entity decrypts the command file using a private encryption key and authenticates it based on a signature key uniquely associated with the build environment. If the proxy entity successfully authenticates the received command file, it will execute the one or more commands included in the command file, otherwise it will drop the message.

Advantages of the embodiments include providing an additional layer of security to control/restrict the ability of third parties to maliciously control network devices. In certain deployments, such as government and financial institutions, there is a requirement that network devices provide secure and continuous services. This, however, can be difficult to enforce, particularly when the software running on remote devices needs to be upgraded or patched due to security concerns. According to embodiments presented herein, when a proxy entity receives a message from the cloud-based management entity, it decrypts the message and verifies the signature, i.e., verifies that the message was signed with an encryption key associated with a build server. In so doing, the proxy entity verifies both that the message was intended for it as well as the authenticity of the build server. Thus, the proxy entity may verify the message source as well as the authenticity of the command based on the build signing key.

The embodiments presented herein provide for a method to securely configure a remote proxy entity. In so doing, a cloud-based management entity can create or update virtual machines running on remote devices, either dynamically or according to a predetermined schedule, while preventing third parties from running malicious code. For example, even if a third party gains access to an authorized user's login credentials, e.g., by eavesdropping or through social engineering, the third party nonetheless will be unable to load the malicious software on the remote device because it cannot authenticate the malicious code as originating from a valid build environment. Thus, the described embodiments provide the agility to remotely execute commands on demand, while providing the security of a signed package whose source may be confidently authenticated as originating from a trusted source.

In one form, a method is provided comprising: at a build server, constructing a command file comprising one or more executable commands, wherein the command file is signed with at least a first signature key associated with the build server; determining whether the command file comprising the one or more executable commands was constructed correctly and signed with the at least first signature key associated with the build server; based at least on the determination of whether the command file comprising the one or more executable commands was constructed correctly and signed with the at least first signature key associated with the build server: encrypting the command file with at least a first encryption key associated with a network device; transmitting the command file to the network device; at the network device, decrypting the command file using at least a second encryption key associated with the network device; authenticating the command file using at least the second signature key associated with the build server; and based at least on results of authenticating the command file, executing the one or more executable commands at the network device.

In another form, a system is provided comprising: a build server configured to construct a command file comprising one or more executable commands, wherein the command file is signed with at least a first signature key associated with the build server, encrypt the command file with at least a first encryption key associated with a network device, and transmit the command file to a network device; and a network device configured to receive the transmitted command file, decrypt the command file using at least a second encryption key associated with the network device, authenticate the command file using at least the second signature key associated with the build server, and based at least on results of authenticating the command file, execute the one or more executable commands.

In yet another form, a non-transitory processor readable medium storing instructions is disclosed that, when executed by a processor, cause the processor to decrypt a command file comprising one or more executable commands using a private encryption key, wherein the command file is signed with at least a private signature key uniquely associated with a build server that constructed the command file; authenticate the command file using at least a public signature key associated with the build server that constructed the command file; and based at least on results of authenticating the command file, execute the one or more executable commands.

The above description is intended by way of example only. Various modifications and structural changes may be made therein without departing from the scope of the concepts described herein and within the scope and range of equivalents of the claims.

What is claimed is:

1. A method comprising:
   at a management entity that manages remote network security devices and including separate ones of a build server, a test server, and a production server:
   at the build server, constructing a command file comprising executable commands that, when executed, control the network security devices, signing the command file with a first signature key associated with the build server, and sending the command file when signed to the test server;
   at the test server, determining whether the command file was constructed correctly and signed with the first signature key, and sending the command file to the production server;
   at the production server, if the command file was constructed correctly and signed with the first signature key:
   encrypting the command file with a first encryption key associated with a network device configured to communicate with the network security devices and act as an intermediary between the management entity and the network security devices and through which the management server controls the network security devices;
   transmitting the command file to the network device over a network; and at the network device;
   decrypting the command file using a second encryption key associated with the network device;
   authenticating the command file using a second signature key associated with the build server; and
   based at least on results of authenticating the command file, executing the executable commands at the network device to control the network security devices.

2. The method of claim 1, wherein the first signature key associated with the build server is a private signature key uniquely associated with the build server and the second signature key associated with the build server is a public signature key related to the first signature key associated with the build server.

3. The method of claim 1, wherein the first encryption key associated with the network device is a public encryption key related to the second encryption key associated with the network device and the second encryption key associated with the network device is a private encryption key uniquely associated with the network device.

4. The method of claim 1, wherein constructing the command file comprises compiling source code associated with the one or more executable commands.

5. The method of claim 1, wherein the one or more executable commands comprise a virtual machine running at the network device.

6. The method of claim 1, wherein the network device is a cloud-based proxy server.

7. The method of claim 1, wherein the network device is a proxy server located at a remote premise.

8. The method of claim 1, wherein transmitting the command file to the network device is in response to the network device powering up.

9. The method of claim 1, wherein transmitting the command file to the network device further comprises:

determining a configuration schedule associated with the network device; and
   based on the configuration schedule, transmitting the command file to the network device.

10. The method of claim 1, wherein determining whether the command file comprising one or more executable commands was constructed correctly and signed with at least a first signature key associated with the build server further comprises:
    encrypting the command file using a first encryption key associated with the test server;
    transmitting the command file to the test server;
    at the test server, decrypting the command file using a second encryption key associated with the test server;
    authenticating the command file using a second signature key associated with the build server;
    based at least on results of authenticating the command file,
    executing the one or more executable commands; and
    determining whether the one or more executable commands executed correctly.

11. The method of claim 10, wherein the first encryption key associated with the test server is a public encryption key related to the second encryption key associated with the test server and the second encryption key associated with the test server is a private signature encryption key uniquely associated with the test server.

12. The method of claim 11, wherein the first and second signature keys associated with the build server are stored in a build data store, the first and second encryption keys associated with the test server are stored in a test data store, and the first and second encryption keys associated with the network device are stored in a production data store, wherein the build data store, the test data store, and the production data store are different data stores.

13. A system comprising:
    a management entity that manages remote network security devices, the management entity including separate ones of a build server, a test server, and a production server, wherein:
    the build server is configured to construct a command file comprising executable commands that, when executed, control the network security devices, and sign the command file with a first signature key associated with the build server;
    the test server is configured to determine whether the command file was constructed correctly and signed with the first signature key; and
    the production server is configured to, if the command file was constructed correctly and signed with the first signature key:
    encrypt the command file with a first encryption key associated with a network device configured to communicate with the network security devices and act as an intermediary between the management entity and the network security devices and through which the management server controls the network security device, and
    transmit the command file to the network device; and
    the network device is configured to:
    receive the transmitted command file and decrypt the command file using a second encryption key associated with the network device;
    authenticate the command file using a second signature key associated with the build server; and based at least on the results of authenticating the command file, execute the executable commands to control the network security devices.

14. The system of claim 13, wherein the first signature key associated with the build server is a private signature key uniquely associated with the build server and the second signature key associated with the build server is a public signature key related to the first signature key associated with the build server.

15. The system of claim 13, wherein the first encryption key associated with the network device is a public encryption key related to the second encryption key associated with the network device and the second encryption key associated with the network device is a private encryption key uniquely associated with the network device.

16. A system comprising:
a management entity configured to communicate with a network and including separate ones of a build server, a test server, and a production server; and
a network device to communicate with network security devices and the network, and configured to act as an intermediary between the management entity and the network security devices and through which the management server controls the network security device;
the build server configured to construct a command file that, when executed, controls the network security devices, and sign the command file with a first signature key associated with the build server;
the test server configured to determine whether the command file was constructed correctly and signed with the first signature key;
the production server configured to, if the command file was constructed correctly and signed with the first signature key, encrypt the command file with a first encryption key associated with the network device, and transmit the command file to the network device; and
the network device configured to:
receive the transmitted command file, decrypt the command file using a second encryption key associated with the network device, authenticate the command file using a second signature key associated with the build server; and
based on results of the authenticating the command file, execute the executable commands to control the network security devices.

17. The system of claim 16, wherein the command file comprises executable commands.

18. The system of claim 16, wherein the first signature key associated with the build server is a private signature key uniquely associated with the build server and the second signature key associated with the build server is a public signature key related to the first signature key associated with the build server.

19. The system of claim 16, wherein the first encryption key associated with the network device is a public encryption key related to the second encryption key associated with the network device and the second encryption key associated with the network device is a private encryption key uniquely associated with the network device.

20. The method of claim 16, wherein the command file comprises a virtual machine running at the network device.

* * * * *

UNITED STATES PATENT AND TRADEMARK OFFICE
CERTIFICATE OF CORRECTION

PATENT NO. : 10,075,439 B1
APPLICATION NO. : 15/158998
DATED : September 11, 2018
INVENTOR(S) : Ryan J. Mullens et al.

Page 1 of 1

It is certified that error appears in the above-identified patent and that said Letters Patent is hereby corrected as shown below:

In the Claims

Claim 1, Column 11, Line 33, please replace "device;" with --device:--

Signed and Sealed this
Fifth Day of February, 2019

Andrei Iancu
*Director of the United States Patent and Trademark Office*